United States Patent
Ohara

(10) Patent No.: US 10,176,506 B2
(45) Date of Patent: Jan. 8, 2019

(54) PRODUCT SEARCH SYSTEM AND PRODUCT SEARCH PROGRAM

(71) Applicant: NOMURA RESEARCH INSTITUTE, LTD., Tokyo (JP)

(72) Inventor: Soichi Ohara, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 14/959,521

(22) Filed: Dec. 4, 2015

(65) Prior Publication Data
US 2016/0086248 A1   Mar. 24, 2016

Related U.S. Application Data

(63) Continuation of application No. PCT/JP2013/065719, filed on Jun. 6, 2013.

(51) Int. Cl.
  *G06Q 30/00* (2012.01)
  *G06Q 30/06* (2012.01)

(52) U.S. Cl.
  CPC ..... *G06Q 30/0629* (2013.01); *G06Q 30/0603* (2013.01)

(58) Field of Classification Search
  CPC .................................. G06Q 30/0629
  USPC ....................................... 705/26.64
  See application file for complete search history.

(56) References Cited

U.S. PATENT DOCUMENTS

| | | | |
|---|---|---|---|
| 2002/0169763 A1* | 11/2002 | Tada | G06F 17/30672 |
| 2004/0034836 A1* | 2/2004 | Ikeno | 715/255 |
| 2004/0199541 A1* | 10/2004 | Goldberg | G06Q 10/06 |
| 2004/0267796 A1* | 12/2004 | Shimogori | G06F 17/30961 |
| 2005/0138018 A1* | 6/2005 | Sakai | G06F 17/3071 |
| 2007/0206884 A1* | 9/2007 | Kato | G06K 9/72 382/305 |

(Continued)

FOREIGN PATENT DOCUMENTS

| | | |
|---|---|---|
| JP | 5-94455 | 4/1993 |
| JP | 2000-207449 | 7/2000 |

(Continued)

OTHER PUBLICATIONS

International Search Report dated Jul. 16, 2013, in corresponding International Application No. PCT/JP2013/065719.

*Primary Examiner* — Yogesh C Garg
*Assistant Examiner* — Lalith M Duraisamygurusamy

(57) ABSTRACT

There is provided a product search system including a user interface through which a target product can be efficiently searched and specified from a number of products registered in a product master with high speed while reducing work load. In a representative embodiment of the present invention, there are provided a phrase analysis unit which acquires a character string of a product name of each of the products contained in a list of the products, divides the character string into phrases by a predetermined division character or a symbol to acquire words, and sets a word satisfying a predetermined condition in each of the words to a search word, and a search word processing unit that shows the search word to the user, narrows the products contained in the list down to products of which the product names contain a search word designated by the user, and outputs the narrowed products.

7 Claims, 6 Drawing Sheets

(56) References Cited

U.S. PATENT DOCUMENTS

| | | | |
|---|---|---|---|
| 2008/0055468 A1* | 3/2008 | Abe | H04N 5/781 |
| | | | 348/515 |
| 2009/0313220 A1* | 12/2009 | Best | G06F 17/30867 |
| 2010/0161659 A1* | 6/2010 | Takeyasu | G06F 17/30864 |
| | | | 707/770 |
| 2010/0205198 A1* | 8/2010 | Mishne | G06F 17/30687 |
| | | | 707/759 |
| 2010/0241507 A1* | 9/2010 | Quinn | G06Q 30/02 |
| | | | 705/14.42 |
| 2012/0066195 A1* | 3/2012 | Lee | G06F 17/3064 |
| | | | 707/706 |
| 2012/0124620 A1* | 5/2012 | Nishizawa | H04N 21/4316 |
| | | | 725/34 |
| 2013/0013427 A1* | 1/2013 | Gonsalves | G06Q 30/02 |
| | | | 705/14.73 |
| 2013/0060843 A1* | 3/2013 | Yamahara | G06Q 10/10 |
| | | | 709/203 |
| 2014/0059069 A1* | 2/2014 | Taft | G06F 17/30442 |
| | | | 707/765 |
| 2015/0006570 A1 | 1/2015 | Masuko | |

FOREIGN PATENT DOCUMENTS

| | | |
|---|---|---|
| JP | 2003-323436 | 11/2003 |
| WO | WO 2007/032483 A1 | 3/2007 |
| WO | WO 2007/135845 A1 | 11/2007 |
| WO | WO 2013/077029 A1 | 5/2013 |

\* cited by examiner

PRODUCT SEARCH SYSTEM AND PRODUCT SEARCH PROGRAM

CROSS-REFERENCE TO RELATED APPLICATIONS

This application is a continuation application filed under 35 U.S.C. § 111(a), of International Application PCT/JP2013/065719, filed Jun. 6, 2013, the contents of which are incorporated herein by reference.

TECHNICAL FIELD

The present invention relates to a technology of searching information, and particularly to a technology which is effectively applied to a product search system and a product search program which specifies a target product from a number of products.

BACKGROUND ART

At a store such as a supermarket where a number of products are displayed and sold, a tablet terminal or an information processing terminal such as a dedicated portable terminal is used for inventory management or an ordering process at the store in many cases. In this case, a person in charge such as a store clerk directly confirms a showcase at the store, and in a case where some products are short, the person in charge designates a target product and puts an order to replenish the product at that place using the portable information processing terminal.

Herein, in a case where the information processing terminal is configured to search the target product by inputting a search keyword such as a product name or a product code in order to designate an ordering product, there is a heavy burden on inputting information at that site and it is not easy to use that configuration. In particular, in a case where a touch panel such as the tablet terminal is employed as the terminal, the inputting is made by a software keyboard which may be cumbersome and difficult for the inputting.

Regarding such a problem, for example, Japanese Patent Application Laid-open Publication No. H5-94455 (Patent Document 1) discloses an ordering system which is used in a sales network where the products sold by a plurality of branch offices are commonly purchased by a head office. In this system, in the head office, a terminal master file is provided to store product data which is created based on product information and supplier information for each of the plurality of branch offices. Further, in the plurality of branch offices, there is provided a portable terminal which has a function of receiving and displaying the product information necessary for ordering the product from the head office, and a function of inputting an ordering quantity for each product and transmitting the ordering quantity to the head office. With this configuration, the products to be ordered at the time of putting an order can be sequentially displayed in the portable terminal in an order of shelf number, and the data entry can be made only by inputting the quantity.

In addition, for example, Japanese Patent Application Laid-open Publication No. 2000-207449 (Patent Document 2) discloses a product image displaying/ordering apparatus including: an input device which is configured by a keyboard and a pointing device to display the ordering product and to put an order of the product; a storage device which stores the product information and information such as the product image; a data processing device which processes information such as the ordering of the product or the displaying of the product image based on the information stored in the storage device when a command is issued from the input device, and outputs a result; and an output device. With this configuration, the products are sequentially displayed in an order of arrangement in the product shelf, so that the ordering process can be smoothly performed.

RELATED ART DOCUMENTS

Patent Documents

Patent Document 1: Japanese Patent Application Laid-open Publication No. H5-94455
Patent Document 2: Japanese Patent Application Laid-open Publication No. 2000-207449

SUMMARY OF THE INVENTION

Problems to be Solved by the Invention

In a case where the portable information processing terminal is used to process the ordering for replenishment of the products in the showcase at the store, there is a problem in that there is a burden on the inputting and the operating for designating a target product from a number of products registered in a product master as described above. Regarding such a problem, for example, it may be considered that the products are classified in a hierarchical structure and then registered on the product master, and a user interface is configured to narrow down the products in a unit of classification along the hierarchical structure.

The products registered in the product master are generally classified in the hierarchical structure according to types of the products. However, in this case, tens or hundreds of mass products may be contained also in the final or end category in the hierarchical structure. The portable information processing terminal used in the work site is limited in its screen size, and displaying characters tend to be reduced in size for the visibility at the site. Therefore, for example, in a case where the narrowed-down products are displayed in a list based on the classification of the products, only about ten products are displayed at once in many times. At this time, in a case where the list contains a number of products, there may be need to scroll or advance pages many times for browsing the other products, which may be cumbersome operations and take times for the processing.

With this regard, for example, as disclosed in Patent Documents 1 and 2, the products are displayed according to an order of arrangement in the shelf based on information of a shelf number, a stage number, and an arrangement position of the shelf where the respective products are arranged, so that a target product is easily specified. However, in this case, the information such as the arrangement positions of the respective products in the showcase is necessarily registered in advance, and it may cause a heavy burden on work. In particular, in a case where the status of the arrangement is frequently changed, it is significantly difficult to accurately confirm the information of the updated arrangement positions of the respective products.

An object of the present invention is to provide a product search system including a user interface and a product search program through which a target product can be efficiently searched and specified from a number of products registered in a product master with high speed while reducing work load.

Means for Solving the Problems

The outline of a representative invention among the inventions disclosed in the present application is described as follows.

A product search system according to a representative embodiment of the present invention is a product search system that narrows down products contained in a list based on a designation of a user to search and specify a target product from the list of products, including: a phrase analysis unit that acquires a character string of a product name of each of the products contained in the list, divides the character string into phrases by a predetermined division character or a symbol to acquire words, and sets a word satisfying a predetermined condition in the respective words to a search word; and a search word processing unit that shows the search word to the user, narrows the products contained in the list down to products of which the product names contain a search word designated by the user, and outputs the narrowed products.

In addition, the present invention may be also applied to a program which is executed by a computer as the product search system.

Effects of the Invention

An effect achieved by the representative invention among the inventions disclosed in the present application is described as follows.

In other words, according to the representative embodiment of the present invention, it is possible to efficiently search and specify a target product from a number of products registered in the product master with high speed while reducing work load.

BRIEF DESCRIPTIONS OF THE DRAWINGS

DETAILED DESCRIPTION OF PREFERRED EMBODIMENTS

Figure 1:
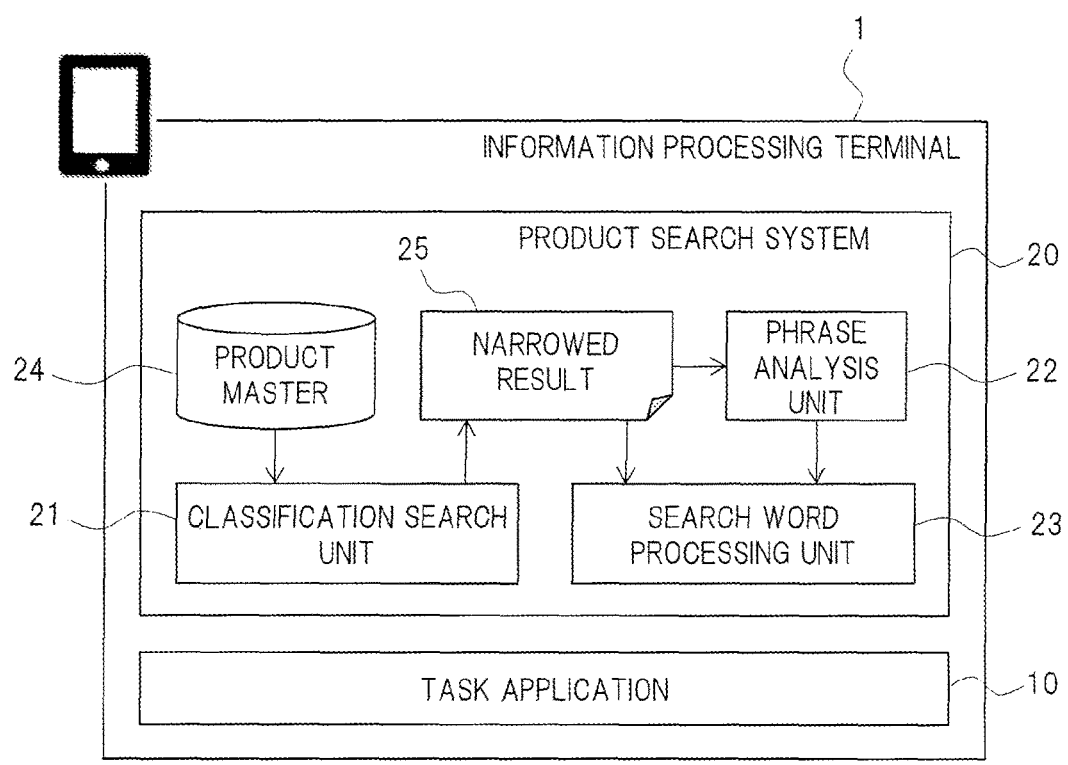
FIG. 1 is a diagram illustrating an outline of an exemplary configuration of an information processing terminal which includes a product search system according to an embodiment of the present invention.

Hereinafter, an embodiment of the present invention will be described in detail with reference to the drawings. Further, the same portions in the drawings for describing the embodiment will be generally denoted by the same symbols, and the description thereof will not be repeated. In addition, the description below will be made in comparison with the related art in order to help with easy understanding of the advantage of the present invention.

Figure 6:
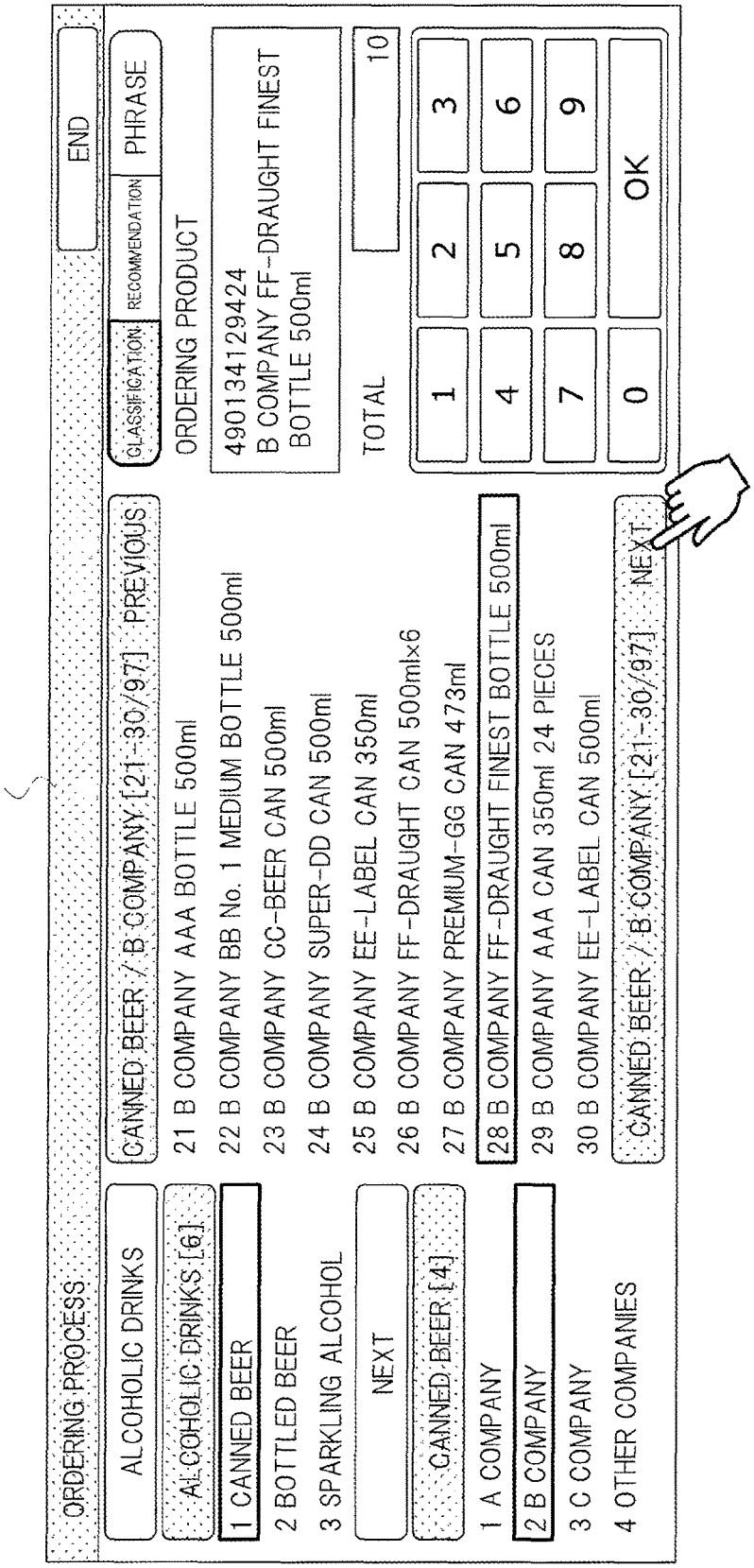
FIG. 6 is a diagram illustrating an outline of an exemplary product search screen according to the embodiment of the present invention, in which the related art is used.

FIG. 6 is a diagram illustrating an outline of an exemplary product search screen in a product search system according to an embodiment of the present invention, in which the related art is used. Herein, there is illustrated an exemplary screen for searching and specifying a target product when a person in charge uses an information processing terminal to put an order to replenish products decreased in quantity in a showcase at a store such as a supermarket.

In an order processing screen 26 displayed on the screen (a touch panel) of the portable information processing terminal, a user selects a "Classification" button arranged on the upper portion of the right column region of the screen to search a product by narrowing down the classification of the product in the related art. In this search, the user narrows down the products registered in a product master in the left column region of the screen by selecting the classification of the products according to a hierarchical structure. In the example of FIG. 6, "Alcoholic Drinks" is selected as a major classification of the products, "Canned Beer" is selected as an intermedium classification from six items belonging to the subject classification, and "B Company" item is selected as a minor classification from four items belonging to the subject classification.

At this time, a list of products (products names) belonging to the classification "Alcoholic Drinks>Canned Beer>B Company" selected in the left column is browsed in the center column region of the screen. However, according to the screen size and the font size of the portable information processing terminal, about 10 products may be displayed on the screen at one time as illustrated in the drawing. Therefore, in a case where the more products (97 products in the example of FIG. 6) belong to the product list, the user necessarily scrolls or advances pages to view the entire list, and it takes a time or a work load for specifying a target product.

For this reason, in the product search system according to the embodiment of the present invention, one or more search words are further extracted and shown based on the product names of the products from the list of the products narrowed down by the classification, and the user can designate a search word to further narrow down the list of the products.

Figure 2:
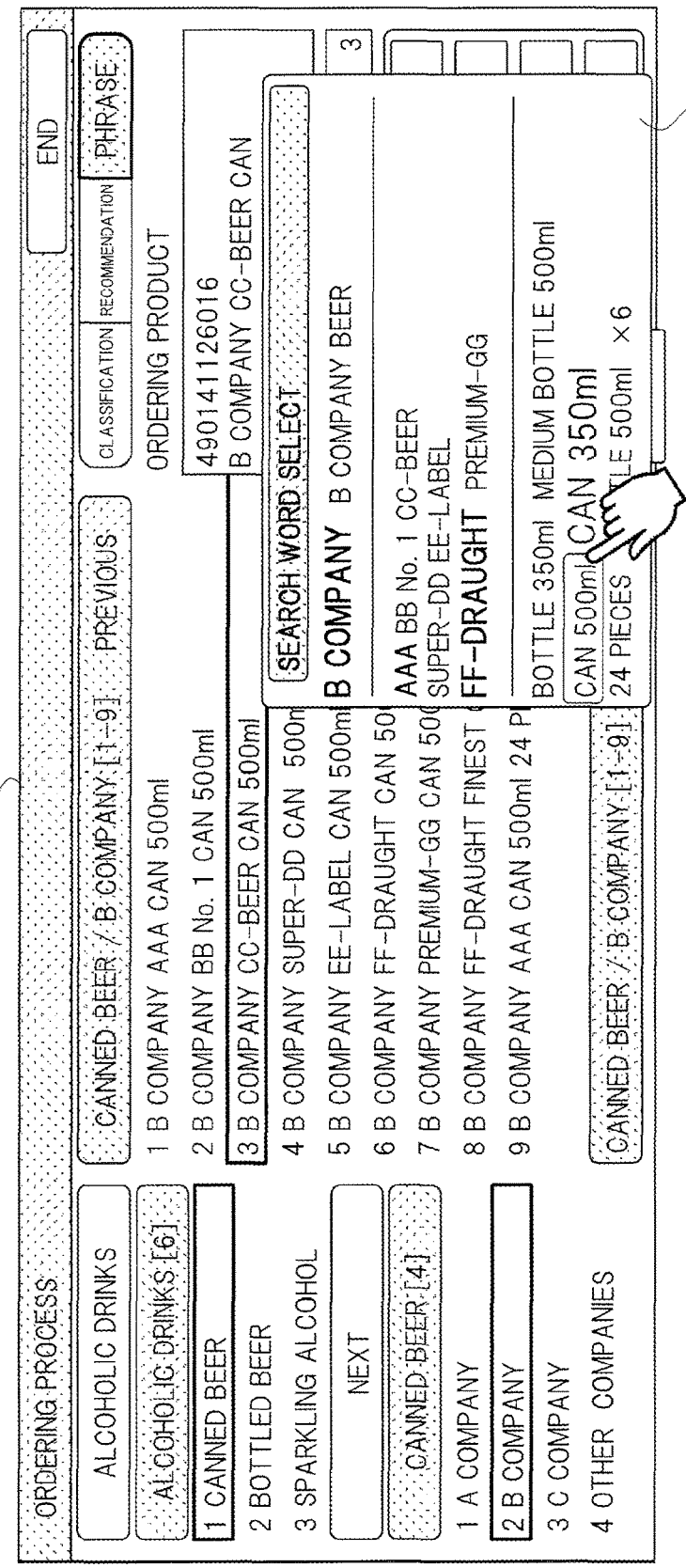
FIG. 2 is a diagram illustrating an outline of an exemplary screen for searching a product according to the embodiment of the present invention.

FIG. 2 is a diagram illustrating an outline of an exemplary product search screen in the product search system according to the embodiment of the present invention. Here, for example, as illustrated in the example of FIG. 6, the user selects a "Phrase" button arranged on the upper portion of the right column region of the screen in order to further narrow down the products in the order processing screen 26 from the narrowed result of the product classification according to the related art. At this time, the product search system analyzes the product names of the respective products belonging to the list, extracts the one or more search words, and displays the search words in a search word select screen 27. When the user selects the search word for narrowing down the search target product from the list, the list of the products displayed in the center column of the screen is narrowed down into a list of the products of which the names contain the subject search word.

For example, in the example of FIG. 2, when the user selects "Can 500 ml" as the search word on the search word select screen 27, only the products of which the names contain the words "Can 500 ml" are listed in the list of the products in the center column of the screen, so that the number of subject products is narrowed down to 9. Therefore, there is no need to scroll or advance the pages to view the entire list. It is possible to put an order by specifying a target product ("B Company CC Beer Can 500 ml" in the example of FIG. 2) with ease and speed through such a narrowing process.

<System Configuration>

FIG. 1 is a diagram illustrating an outline of an exemplary configuration of the information processing terminal of the product search system according to the embodiment of the present invention. An information processing terminal 1 is configured by, for example, a portable information processing device such as a general-purpose tablet terminal equipped with the touch panel or a dedicated terminal for processing the order. In this embodiment, the portable information processing device is exemplified in consideration of the store such as a supermarket, but the information processing device such as a PC (Personal Computer) may be employed.

The information processing terminal 1 includes a task application 10 installed as software executed on middleware such as an OS (Operating System; not illustrated), and a product search system 20. These components may be implemented by executing program or a module stored in a local storage device of the information processing terminal 1, or may be connected to an application server (not illustrated) through a network using a Web browser (not illustrated) and implemented by executing a program or a module stored on the application server onto a client side.

For example, the task application 10 is an application program through which the user searches the product using the product search system 20 in processes of ordering/requesting/purchasing of the products or inventory management, and is used to perform a predetermined process on the searched product. In this embodiment, it is assumed that the task application is an application program to perform processes such as replenishing of the products of the showcase at the store such as a supermarket.

The product search system 20 is a sub system which provides a function of searching and specifying the product to the task application 10 or the user who uses the task application, and includes units such as a classification search unit 21, a phrase analysis unit 22, and a search word processing unit 23 installed as software programs. In addition, a product master 24 is provided as a data structure for storing master information of the products.

For example, the product master 24 may be stored in the local storage device of the information processing terminal 1 as a database or a file table, or may be stored in the application server (not illustrated) in the database. In addition, in a case where the product master is stored in the application server as a database, the content thereof may be acquired and developed in a local memory in advance.

The classification search unit 21 has a function of searching and extracting the products registered in the product master 24 and belonging to the classification designated by the user, and of storing the result in a memory as a narrowed result 25. In addition, the classification search unit has a function of outputting these products through a user interface (not illustrated) as a list as illustrated in the examples of FIGS. 2 and 6. As described above, in a case where the product master 24 is stored on the application server, the searched and extracted result on the server side may be acquired and stored as the narrowed result 25. Further, the subject function may be equal to the narrowing process by the classification of the products in the related art described above, or various well-known schemes may be appropriately employed.

The phrase analysis unit 22 has a function of acquiring and analyzing text data of the product name with respect to each of the products narrowed down in a unit of classification of the classification search unit 21 based on a command from the user, and of extracting the search word as a keyword for the search.

In a case where the product names are disorderly set for the registration when the respective products are registered in the product master 24, it is extremely not easy to use. Therefore, in general, when the product name is registered, a character string of the product name is set and defined according to a certain rule or a format. For example, the character string of the product name is set in an order of a maker name, a product name, a rank, and a net content/size with a space therebetween for the separation.

Here, in this embodiment, the character string of the product name is divided into words in a unit of phrase using the space or other symbols (comma, period, colon, parenthesis, etc.) as a separator. Even in a case where there is no separation symbol, the character string may be divided before and after a predetermined keyword such as the maker name or the brand name.

Among the words obtained through the division, words matched to a predetermined condition are extracted as the search words, and an appearance number is counted for each search word. As the predetermined condition, for example, it is possible to designate a condition of length such that a short word containing only one alphanumeric character is excluded because of a lack of discrimination in many cases, and on the contrary a long word containing ten or more characters is excluded in view of a degradation of processing efficiency or saving of display region.

The search word processing unit 23 outputs the search word extracted by the phrase analysis unit 22 through the user interface (not illustrated) as shown in the exemplary search word select screen 27 of FIG. 2, for example. In addition, the search word processing unit 23 has a function of extracting the product of which the product name in the narrowed result 25 contains the search word selected by the user in the search word select screen 27, and of outputting the product as a product list through the user interface (not illustrated) as illustrated in the example of FIG. 2 (that is, narrowing and outputting the product list).

When the search word is output to the search word select screen 27, the search word may be classified and divided for the displaying as illustrated in the example of FIG. 2. For example, the search word containing the maker name or the brand name ("B Company" in the example of FIG. 2) may be individually divided for the displaying (the upper stage of the search word select screen 27 in the example of FIG. 2). In addition, since a word indicating the net content or the size is generally designated in the tail of the product name in many cases, a word indicating a numerical at the tail of the product name ("Bottle 350 ml" or "Can 500 ml" in the example of FIG. 2) can be individually divided for the displaying as the search word indicating the net content (the lower stage of the search word select screen 27 in the example of FIG. 2).

Further, in this case, a numerical portion ("500 ml" in the case of "Can 500 ml") and the portion other than the numerical portion (for example, "Can" in the case of "Can 500 ml" indicating the type) may be further divided as the search word belonging to the other section. Thereby, for example, the products of "500 ml" can be easily narrowed down without a limitation onto the type such as "Bottle" or "Can", and the products of "Can" can be easily narrowed down regardless of the net content.

In addition, the search word matched to the predetermined condition may be highlighted by thickening the font, increasing the font size, or changing a display color. For example, the search word of which the appearance number counted by the phrase analysis unit 22 is equal to or more than a predetermined number or the search word highly ranked at a predetermined level may be highlighted. In addition, a predetermined type of search word may be highlighted. For example, as same with those described above, in the case of the search word indicating the numeral (the net content or the size), the search word at the head of the product name, the search word indicating attributes such as a color and a country, the highlighting may be performed. Thereby, the user can efficiently select and designate the search word.

Further, in a case where the user selects a new other search word in the search word select screen 27 illustrated in the example of FIG. 2, the narrowing process may be performed again based on the search word newly selected while once resetting the narrowing process based on the current search word. In addition, a plurality of search words may be selected, and the narrowing process may be performed in an AND/OR condition of these search words.

<Data Configuration>

Figure 3:
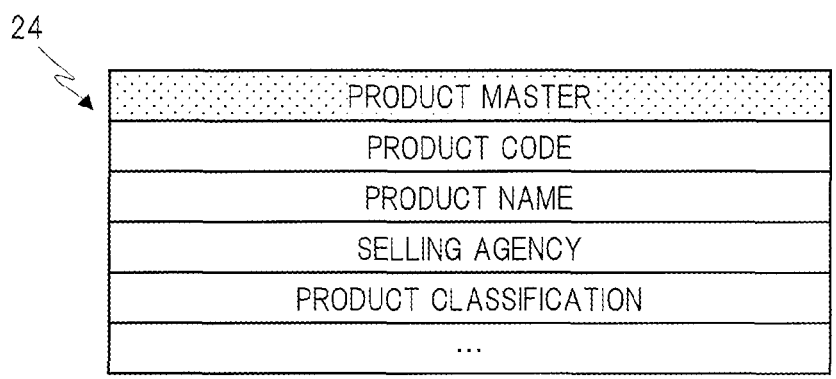
FIG. 3 is a diagram illustrating an outline an exemplary data configuration of a product master according to the embodiment of the present invention.

FIG. 3 is a diagram illustrating an outline of an exemplary data configuration of the product master 24 according to this embodiment. The product master 24 is a table in which the master information of the products searchable in the product search system 20 shown in FIG. 1 (the products which can be used and referred by the task application 10) is stored, and includes items such as a product code, a product name, a selling agency, and a product classification.

In the product code item, information such as a code value for uniquely identifying each product is stored. In the product name, character information indicating the product name of a target product is stored. In the character string of the product name, for example, information indicating the maker name or the brand name, the product name in a narrow sense, the rank or the grade, and the net content or the size as illustrated in the example of FIG. 2 is contained in a state where these words are separated by a symbol such as a space or a comma. Further, in this embodiment, as described above, the character string of the product name is separated into phrases by the symbol so as to acquire the search word. Therefore, in a case where there is an existing product master 24, there is no need to convert or move data to make the existing product master suited to the product search system 20 of this embodiment, so that the existing product master 24 can be used without any change as it can be.

In the selling agency item, attribute information such as a selling agency, a maker, and a producer of the target product is stored. In the product classification item, information such as a classification code for specifying a classified section to which the target product belongs is stored. As described above, the classification of the product is managed by the hierarchical structure for example, and definition information of the hierarchical structure is set or stored in a database or a file table (not illustrated).

Further, the data configuration (item) of the product master 24 illustrated in FIG. 3 is given as a mere example. Other table configurations or data configurations may be employed as long as the similar data can be stored and managed.

<Processing Flow>

Figure 4:
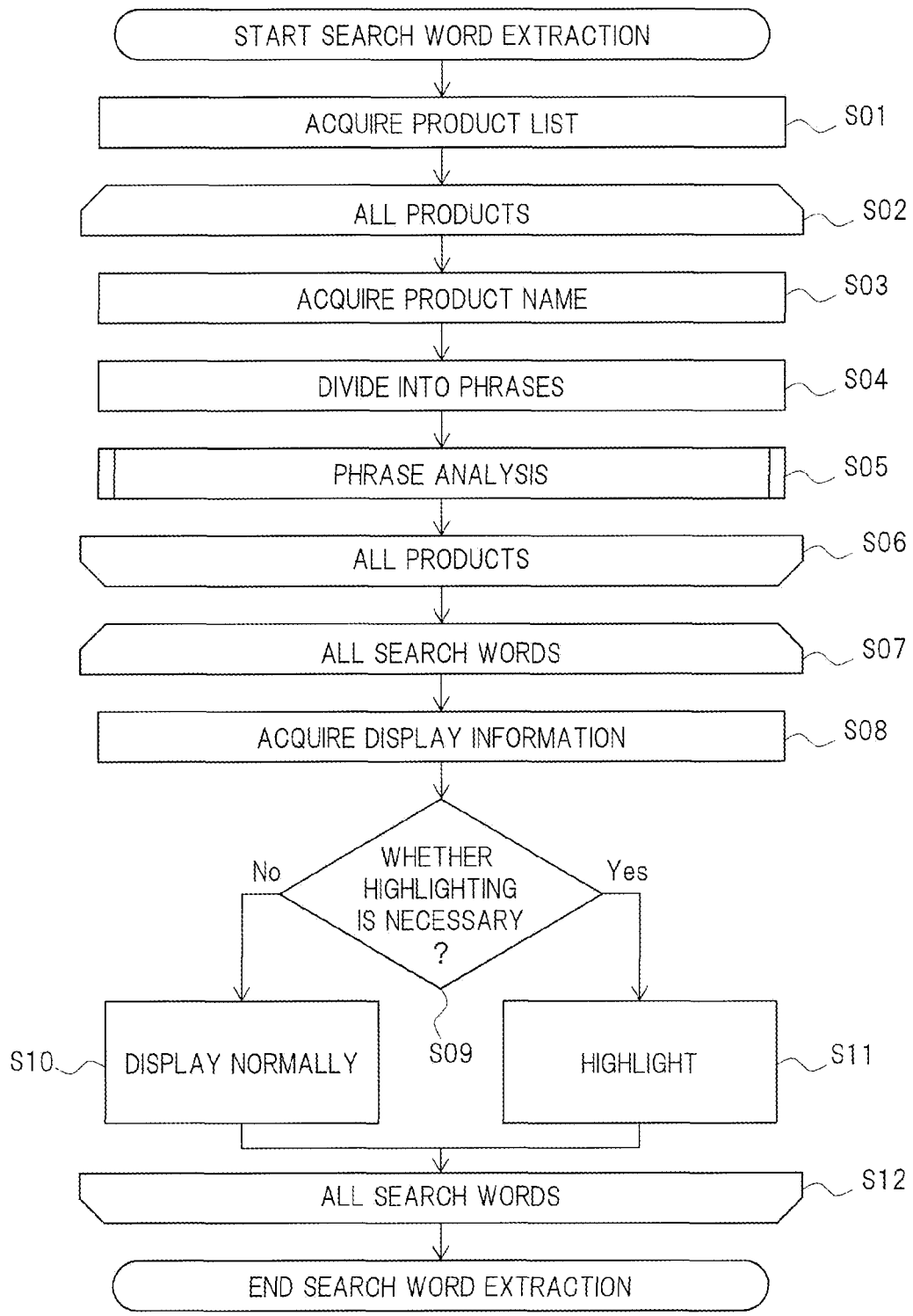
FIG. 4 is a flowchart illustrating an outline of an exemplary processing flow of extracting a search word to be displayed in a search word select screen according to the embodiment of the present invention.

FIG. 4 is a flowchart illustrating an outline of an exemplary processing flow of extracting the search word to be displayed in the search word select screen 27 when the user selects a "Phrase" button arranged on the upper portion in the right column region of the order processing screen 26 illustrated in the example of FIG. 2 in order to further narrow down the products in a state where the narrowing based on the product classification is made by the classification search unit 21 of the product search system 20.

First, in the product search system 20, the phrase analysis unit 22 acquires a narrowing target product list (S01). Specifically, a content of the narrowed result 25 which is the list of the products extracted by the classification search unit 21 from the product master 24 is acquired.

Next, a loop process in which all the acquired products are repeatedly processed is started (S02). In the loop process, first, the character string of the product name of the target product is acquired (S03), and the acquired character string is divided in a unit of phrase using a predetermined separation symbol such as a space (S04). As described above, in a case where there is no predetermined separation symbol in the product name or in a case where these symbols are not used, the predetermined keyword such as the maker name or the brand name may be used instead of the predetermined section symbol for the division before and after the keyword. Thereafter, a phrase analysis process is performed in which all the phrases obtained through the division are analyzed to extract the search word (S05). The content of the phrase analysis process will be described below. A series of processes described above are repeatedly performed on each product (S06, S02).

When the loop process is ended (S06), the loop process is started repeatedly on all the search words extracted in the phrase analysis process of Step S05 (S07). In the loop process, first, display information on the target search word, that is, information on the section (the upper stage, the intermediate stage, and the lower stage in the search word select screen 27 of FIG. 2) for displaying the target search word in the search word select screen 27 or information on necessity of a highlighting is acquired (S08). The display information is information to be set to each search word in the phrase analysis process of Step S05.

Next, it is determined whether the highlighting is necessary for the target search word (S09). In a case where the highlighting is not necessary, the target search word is normally displayed in the corresponding section in the search word select screen 27 (S10). On the other hand, in a case where the highlighting is necessary, the target search word is highlighted in the corresponding section in the search word select screen 27 (S11). The series of processes described above are repeatedly performed on each search word (S12, S07). Through the above processes, it is possible to display the search word select screen 27 which displays the search words for performing the narrowing further more based on the product name.

Figure 5:
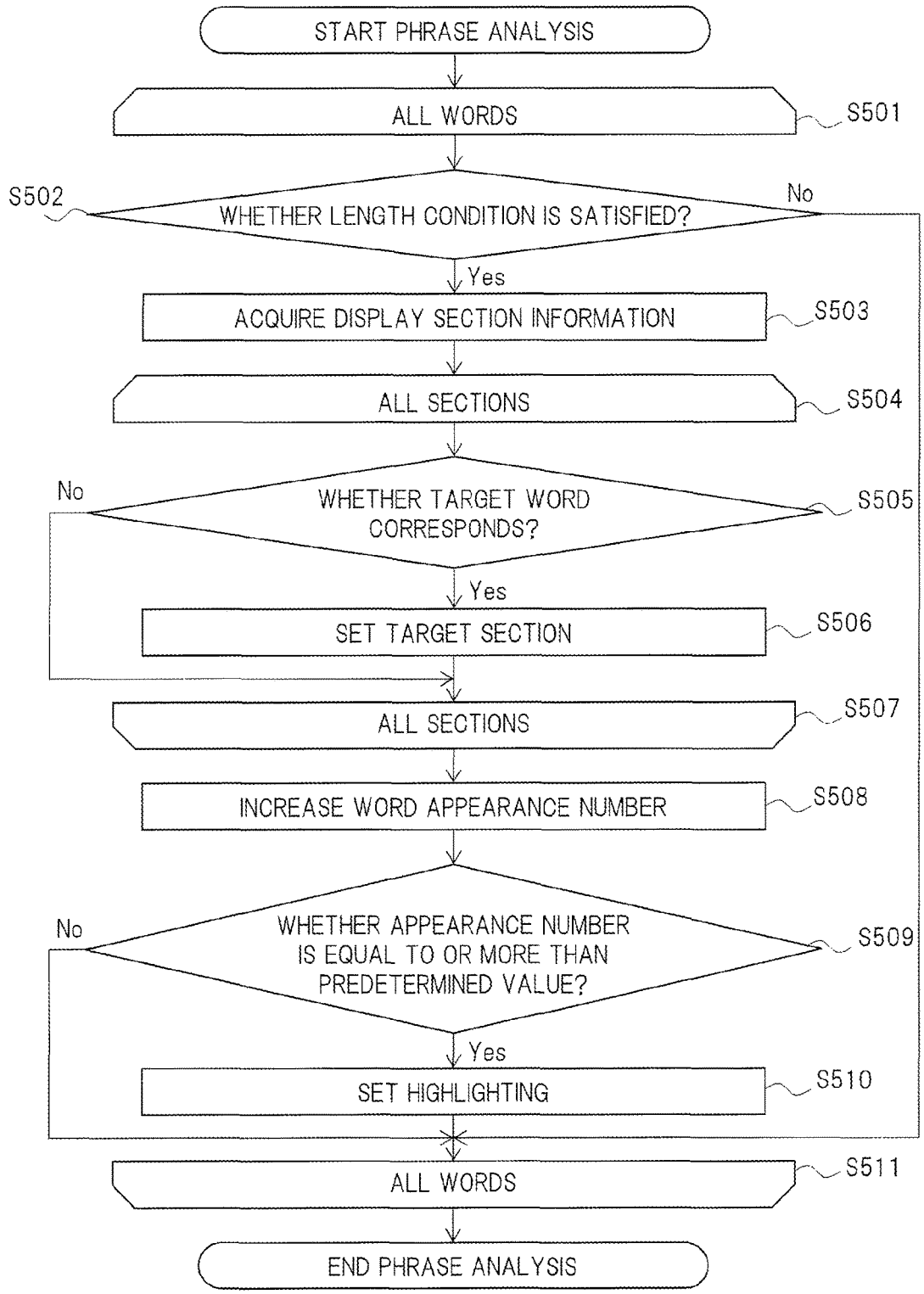
FIG. 5 is a flowchart illustrating an outline of an exemplary flow of a phrase analysis process according to the embodiment of the present invention.

FIG. 5 is a flowchart illustrating an outline of an exemplary flow of the phrase analysis process of Step S05 of FIG. 4. In the phrase analysis process, first, the loop process is started which is repeatedly performed on all the phrases (words) obtained in Step S04 of FIG. 4 (S501). In the loop process, first, it is determined whether a length condition of the target word is satisfied (S502). For example, as described above, the short word containing only one alphanumeric character and the long word containing ten or more characters are excluded from the target search words. In a case where the length condition is not satisfied, the process on the target word is ended, and the next word is subjected to the loop process (S511, S501).

In a case where the length condition is satisfied in Step S502, the target word becomes the search word. In this case, next, the subject search word is classified to acquire setting information of each section used when the search word is displayed the search word select screen 27 (S503), and the loop process is started repeatedly on all the acquired types in the section (S504). As described above, examples of the section include a section of the search word indicating the maker or the brand name (the section at the upper stage in the exemplary search word select screen 27 of FIG. 2), a section of the search word indicating the net content at the tail of the product name (a section at the lower stage in the exemplary search word select screen 27 of FIG. 2), and a section of the search word which does not belong to any of the above sections (the section at the intermediate stage in the exemplary search word select screen 27 of FIG. 2). Further, for example, the setting information such as the condition of each section may be previously set in a setting file (not illustrated) which is configured to be appropriately added, deleted, and changed.

In the loop process for each section, first, it is determined whether the target search word corresponds to the target section (S505). In a case where the target search word does not correspond to the target section, the process for the target section is ended, and the next section is subjected to the loop process (S507, S504). In a case where the target search word corresponds to the target section, the target section is set as a section to which the target search word belongs (S506), the process for the target section is ended, and the next section is subjected to the loop process (S507, S504). Further, as a process of setting the section with respect to the target search word, for example, information of a code value indicating the section may be appropriately added with respect to information on the target search word developed on a memory.

When the loop process for the respect sections is ended, the appearance number of the target search word is increased by 1 (S508). The appearance number of each search word is, for example, stored in a memory, and the appearance number is recorded in the product names of all the narrowing target products. Therefore, in a case where the target search word appeared already and counted, the current counted number is increased by 1. In addition, in a case where the target search word did not appear, the appearance number of the search word is newly written as 1 to the memory.

Thereafter, it is determined whether the appearance number of the target search word is equal to or more than a predetermined value (S509). In a case where the appearance number is less than the predetermined value, the process for the target search word is ended, and the next word is subjected to the loop process (S511, S501). In a case where the appearance number is equal to or more than the predetermined value, the target search word is set to be highlighted (S510), the process for the target search word is ended, and the next word is subjected to the loop process (S511, S501).

As described above, examples of the highlighting means may include the thickening of the font, the increasing of the font size, and the changing of the display color. In addition, in the example of FIG. 5, although a condition of determining whether the appearance number of the search word is equal to or more than a predetermined value may be considered as the condition of determining whether the highlighting is necessary, additionally or instead thereof, other conditions may be considered. For example, as described above, in the case of the search word indicating the numeral (the net content or the size), the search word at the head of the product name, the search word indicating attributes such as a color and a country, the highlighting may be performed.

Further, although this embodiment has been described by giving an example in which the product is searched in the task application 10 used to replenish the products in the showcase at the supermarket, the content of the task application 10 is not limited thereto. For example, the product search system 20 may be applied to a Web site in which an end user can purchase various types of products on the Internet using the PC or the portable terminal.

In a case where the system is configured to show the products to the end user, the product names may be set to the product master 24 with expressions for easy understanding of the end user in many cases. Therefore, it is possible to configure the system to acquire an appropriate search word by appropriately setting symbols (comma, parenthesis, etc.) other than the space, for example, as a separation symbol as described above so as to be appropriately divided into phrases in the phrase analysis unit 22, or by appropriately setting a division keyword such as a country name or a brand name.

In addition, in a case where the product name for displaying is set to a simple one, the appropriate search word can be obtained by setting a virtual product name on the product master 24 for performing the narrowing by the search word unlike the simple product name for displaying. For example, as the virtual product name, the character string is created by linking various types of attribute information such as the product name, the maker name, the brand name, the color, the size, and the net content with a blank therebetween, and is set in the product master 24. Thereby, regardless of the product name for displaying, various types of attribute information can be extracted and displayed as the search word.

As described above, according to the product search system in the embodiment of the present invention, the product name of each product is further divided into words from the product list narrowed down by the hierarchical structure of the classification, and the one or more search words are extracted and shown based on the product name thus narrowed, so that the user can further narrow down the product list by designating the search word. Thereby, when the user specifies a product from a number of products registered in the product master 24, the candidate products can be speedily narrowed down by an easy operation. Further, since the operations such as the scrolling of the screen and the advancing of the pages can be excluded as less as possible, it is possible to search and specify the target product with ease and speed.

Hitherto, the present invention made by the inventor has been specifically described based on the embodiment, but the present invention is not limited to the above embodiment and various modifications can be made within a scope not departing from the spirit. For example, the above embodiment has been described in detail in order to help with understanding of the present invention, but it is not necessary that all of the configurations described above are provided. In addition, some of the configurations of the above embodiment may be configured in other types, omitted, or replaced.

In addition, control lines and information lines considered as necessary for the explanation are illustrated in the above described drawings, but all the control lines and information lines are not necessarily installed. In practice, it can be considered that almost all the configurations are connected to each other.

INDUSTRIAL APPLICABILITY

The present invention can be applied to a product search system and a product search program, in which a target product is specified from a large number of products.

REFERENCE SIGNS LIST 1 information processing terminal
10 task application
20 product search system
21 classification search unit
22 phrase analysis unit
23 search word processing unit
24 product master
25 narrowed result
26 order processing screen
27 search word select screen

The invention claimed is:

1. A product search device configured to narrow down products contained in a list based on a designation of a user to search and specify a target product from the list of products, each of the products having a classification set thereto in advance and a character string of a product name including a plurality of attributes of the product, the product search device comprising:
   a screen on which a button is arranged, the screen being configured to display a narrowed-down result obtained by narrowing down the products contained in the list based on one or more classifications designated by the user; and
   a processor, when detecting that the button has been selected by the user, being programmed to:
   (a) acquire a character string of a product name of each of the products contained in the narrowed-down result;
   (b) divide each of the acquired character strings into phrases by a predetermined separation character or separation symbol to acquire words, each of the words including at least one of the attributes;
   (c) set one or more words in the acquired words as search words;
   (d) display the search words to the user on a pop-up screen displayed within the screen;
   (e) receive a designation of a specific search word from the user via the pop-up screen;
   (f) further narrow down the products contained in the narrowed-down result to products having product names containing the specific search word designated by the user on the pop-up screen;
   (g) display the narrowed products on the screen; and
   (h) repeatedly execute (e), (f), and (g) above without resetting the processing associated with any previously designated specific search words until the user selects one of the products displayed on the screen without the user scrolling the screen or advancing a page on the screen.

2. The product search system according to claim 1, wherein the processor is further programmed to:
   count an appearance number of each of the search words in the product name of each of the products contained in the list, and
   highlight search words in each of which the appearance number of the search word is equal to or more than a predetermined value.

3. The product search device according to claim 1, wherein the processor is further programmed to set one or more words in the words of the narrowed products as the search words before executing (h), each of the one or more words including at least one of the attributes.

4. A product search system, comprising:
   a database configured to store a list of products, each product in the list including a classification previously set thereto and a character string that includes a plurality of attributes of the product;
   a memory configured to store an executable program;
   a mobile terminal that includes:
      a screen on which a button is arranged, the screen being configured to display a narrowed-down result obtained by narrowing down the products contained in the list based on one or more classifications designated by a user; and
      a processor programmed to access the database and read the executable program from the memory, the processor being further programmed to:
      (a) when detecting that the button has been selected by the user, acquire a character string of a product name of each of the products contained in the narrowed-down result;
      (b) divide each of the acquired character strings into phrases by a predetermined separation character or separation symbol to acquire words, each of the words including at least one of the attributes;
      (c) set one or more words in the acquired words as search words;
      (d) display the search words to the user on a pop-up screen displayed within the screen of the mobile terminal;
      (e) receive a designation of a specific search word from the user via the pop-up screen;
      (f) further narrow down the products contained in the narrowed-down result to products having product names containing the specific search word designated by the user on the pop-up screen;
      (g) display the narrowed products on the screen of the mobile terminal; and
      (h) repeatedly execute (e), (f), and (g) above without resetting the processing associated with any previously designated specific search words until the user selects one of the products displayed on the screen of the mobile terminal without the user scrolling the screen or advancing a page on the screen of the mobile terminal.

5. The product search system according to claim 4, wherein the processor is further programmed to set one or more words in the words of the narrowed products as the search words before executing (h), each of the one or more words including at least one of the attributes.

6. A method of narrowing down products contained in a list based on a designation of a user via a terminal device to search and specify a target product from the list of products, each of the products having a classification set thereto in advance and a character string of a product name including a plurality of attributes of the product, the terminal device comprising a screen on which a button is arranged, the method comprising:
   (a) displaying a narrowed-down result obtained by narrowing down the products contained in the list based on one or more classifications designated by the user;
   (b) when detecting that the button has been selected by the user, acquiring a character string of a product name of each of the products contained in the narrowed-down result;

(c) dividing each of the acquired character strings into phrases by a predetermined separation character or separation symbol to acquire words, each of the words including at least one of the attributes;

(d) setting one or more words in the acquired words as search words;

(e) displaying the search words to the user on a pop-up screen displayed within the screen on the terminal device;

(f) receiving a designation of a specific search word from the user via the pop-up screen;

(g) further narrowing down the products contained in the narrowed-down result to products having product names containing the specific search word designated by the user on the pop-up screen;

(h) displaying the narrowed products on the screen of the terminal device; and (i) repeatedly executing (f), (g), and (h) above without resetting the processing associated with any previously designated specific search words until the user selects one of the products displayed on the screen of the terminal device without the user scrolling the screen or advancing a page on the screen of the terminal device.

7. The method according to claim 6, further comprising:

(j) setting one or more words in the words of the narrowed products as the search words before (i), each of the one or more words including at least one of the attributes.

* * * * *

UNITED STATES PATENT AND TRADEMARK OFFICE
CERTIFICATE OF CORRECTION

PATENT NO. : 10,176,506 B2
APPLICATION NO. : 14/959521
DATED : January 8, 2019
INVENTOR(S) : Soichi Ohara Page 1 of 1

It is certified that error appears in the above-identified patent and that said Letters Patent is hereby corrected as shown below:

In the Claims

In Column 11, Line 60:
In Claim 2, Delete "system" and insert -- device --, therefor.

Signed and Sealed this
Twenty-third Day of April, 2019

Andrei Iancu
*Director of the United States Patent and Trademark Office*